United States Patent
Yaku

(10) Patent No.: US 10,184,810 B2
(45) Date of Patent: Jan. 22, 2019

(54) ENCODER HAVING LIGHT-RECEIVING UNIT THAT INCLUDES LIGHT-RECEIVING ELEMENT ARRAY

(71) Applicant: Mitutoyo Corporation, Kawasaki, Kanagawa (JP)

(72) Inventor: Toru Yaku, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 210 days.

(21) Appl. No.: 15/255,712

(22) Filed: Sep. 2, 2016

(65) Prior Publication Data

US 2017/0067758 A1    Mar. 9, 2017

(30) Foreign Application Priority Data

Sep. 8, 2015   (JP) ................. 2015-176459

(51) Int. Cl.
*G01D 5/347*    (2006.01)

(52) U.S. Cl.
CPC ..... *G01D 5/34746* (2013.01); *G01D 5/34715* (2013.01)

(58) Field of Classification Search
CPC ......... G01D 5/34; G01D 5/38; G01D 5/34707
See application file for complete search history.

(56) References Cited

U.S. PATENT DOCUMENTS

| 6,963,409 B2 | 11/2005 | Benner et al. |
| 7,230,726 B2 | 6/2007 | Holzapfel et al. |
| 7,307,789 B2 | 12/2007 | Mizutani |
| 2001/0024327 A1 | 9/2001 | Fujimoto et al. |
| 2005/0168757 A1* | 8/2005 | Benner ............ G01D 5/34715 356/616 |
| 2006/0202112 A1 | 9/2006 | Mizutani |
| 2016/0033883 A1 | 2/2016 | Miyakawa |

FOREIGN PATENT DOCUMENTS

| EP | 1 701 138 | 9/2006 |
| JP | 2005-522682 | 7/2005 |
| JP | 2006-284563 | 10/2006 |
| WO | 2014/080957 | 5/2014 |

OTHER PUBLICATIONS

European Search Report dated Jan. 24, 2017.

* cited by examiner

*Primary Examiner* — Thanh Luu
(74) *Attorney, Agent, or Firm* — Rankin, Hill & Clark LLP

(57) ABSTRACT

A scale includes a grating pattern arranged in a measurement direction. A detection head can be moved relative to the scale in the measurement direction and outputs an electric signal indicating a result of detection of the pattern. An operation unit calculates a relative displacement of the detection head relative to the scale. The detection head irradiates the scale with light. A light-receiving unit includes a light-receiving element array arranged in the measurement direction and outputs a result of detection of the irradiation light applied to the light-receiving element array as the electric signal. An optical system forms light from the scale into interference fringes on a light-receiving surface of the light-receiving unit by using lens arrays arranged in the measurement direction. A lens array pitch between neighboring lenses of the lens arrays is not equal to an integral multiple of a pitch of the grating pattern.

10 Claims, 10 Drawing Sheets

ENCODER HAVING LIGHT-RECEIVING UNIT THAT INCLUDES LIGHT-RECEIVING ELEMENT ARRAY

CROSS REFERENCE TO RELATED APPLICATIONS

This application is based upon and claims the benefit of priority from Japanese patent application No. 2015-176459, filed on Sep. 8, 2015, the disclosure of which is incorporated herein in its entirety by reference.

BACKGROUND OF THE INVENTION

1. Field of the Invention

The present invention relates to an encoder.

2. Description of Related Art

Currently, as a type of an apparatus for measuring a displacement, an optical linear encoder is known. The optical linear encoder includes a scale and a detection head that moves along the scale. The scale is provided with, for example, an absolute pattern for detecting a reference position and an incremental pattern for detecting a relative displacement between the scale and the detection head. The optical linear encoder determines the reference position by using a reference signal which is a result of the detection of the absolute pattern on the scale. Further, a positional relation between the scale and the detection head can be detected by taking the above-described displacement into account while using the reference position as the reference.

An example of an optical linear encoder is an encoder that detects a scale grating having continuous periodicity by using a lens array optical system (Published Japanese Translation of PCT International Publication for Patent Application, No. 2005-522682). In this encoder, the pitch of the lens array is determined so that phases of formed images are synchronized or a specific phase shift occurs on the boundary of the range where the optical system projects the image by each individual lens constituting the lens array. In this way, a collection of local images formed by the lens array can be detected by using one light-receiving element array.

Further, an encoder that forms an image of a grating pattern by using a telecentric optical system has also been proposed (Japanese Unexamined Patent Application Publication No. 2006-284563).

SUMMARY OF THE INVENTION

However, the present inventor has found the following problems in the above-described encoders. In the above-described encoders, it is necessary to achieve an accurate determination of the pitch of the lens array, thus requiring a precise manufacturing technique for the manufacturing of the lens array. Further, even if the lens array can be precisely manufactured, the pitch of the lens array could change due to the expansion/contraction of the material of the lens array as the ambient temperature around the lens array fluctuates under environments where the ambient temperature tends to fluctuate. For example, under the condition where: plastic is used as the material for the lens array; the expected linear expansion coefficient is $60 \times 10^{-6}$ (1/° C.); the expected temperature variation is 100° C.; and the lens pitch is 1 mm, the pitch is expected to fluctuate by 6 µm. Therefore, when the period of the pattern of the scale is equal to or shorter than 10 µm, the pitch fluctuation cannot be ignored. Although it is conceivable to use glass material having a small linear expansion coefficient, the use of the glass material increases the material cost and the manufacturing cost. Further, the pitch of the lens array is in synchronization with the pattern of the scale, i.e., the pitch of the lens array is set to an integral multiple of the pattern of the scale. Therefore, the image formed by the lens array is periodically affected by certain lens aberrations.

FIG. 10 schematically shows an effect of aberrations in an ordinary encoder. In a scale 71, for example, an incremental pattern is formed, and light-transmitting parts 71A and non-transmitting parts 71B are arranged in a repetitive manner in a measurement direction (X-direction). The scale 71 is irradiated with light PL. Then, by using a lens array 72, the light that has passed through the scale 71 forms an image, i.e., interference fringes FP on a light-receiving surface 73 of a light-receiving unit. In the lens array 72, lenses 72A are arranged in a repetitive manner with a pitch (lens array pitch) AG in the measurement direction (X-direction). In this example, the lens array pitch AG is determined so that it is equal to an integral multiple of the pitch P of the grating pattern of the scale 71.

As a result, as shown in FIG. 10, the aberration ABE shows a tendency that it is periodically repeated with a period equivalent to an integral multiple of the pitch P of the grating pattern of the scale 71 (i.e., the lens array pitch AG). It should be noted that the effect of the aberration ABE on the peak of the interference fringes FP, which periodically appears with the pitch P, is also repeated with the lens array pitch AG. Consequently, the effect inherent to the aberration may also occur in the result of the detection of the interference fringes FP output by the light-receiving unit so that the accuracy of the interference fringe detection is liable to deteriorate.

The present invention has made in view of the above-described circumstances and an object thereof is to prevent or reduce the effect of lens aberration in an encoder using an optical system formed by using a lens array.

A first exemplary aspect of the present invention is an encoder including:

a scale with a pattern formed thereon, the pattern being arranged in a measurement direction;

a detection head configured to be moved relative to the scale in the measurement direction and output an electric signal indicating a result of detection of the pattern; and an operation unit configured to calculate a relative displacement of the detection head relative to the scale from the electric signal, in which the detection head includes:

a light source configured to irradiate the scale with light;

a light-receiving unit including a light-receiving element array arranged in the measurement direction and configured to output a result of detection of the irradiation light applied to the light-receiving element array as the electric signal; and an optical system configured as an erect-image optical system, the erect-image optical system being configured to form light from the scale into interference fringes on a light-receiving surface of the light-receiving unit by using a lens array arranged in the measurement direction, in which a pitch between neighboring lenses of the lens array is not equal to an integral multiple of a pitch of the pattern.

In this way, since the pitch of the lens array is not equal to an integral multiple of the pitch of the pattern, the effect of the aberration due to the lenses of the lens array is averaged and hence the effect of the aberration can be reduced as observed over the whole interference fringes.

A second exemplary aspect of the present invention is the above-described encoder, in which the optical system is preferably a 1-power erect-image optical system.

In this way, an encoder including a 1-power erect-image optical system capable of reducing the effect of the aberration can be implemented in a concrete manner.

A third exemplary aspect of the present invention is the above-described encoder, in which
the optical system preferably includes:
a first lens array disposed adjacent to the scale in an irradiation direction of the light source;
a second lens array disposed on a side of the first lens array on which the light-receiving unit is disposed; and
a third lens array disposed on a side of the second lens array on which the light-receiving unit is disposed, and
pitches between lenses included in the first to third lens arrays in the measurement direction are preferably equal to each other.

In this way, an encoder including a 1-power erect-image optical system formed by three lens arrays and capable of reducing the effect of the aberration can be implemented in a concrete manner.

A fourth exemplary aspect of the present invention is the above-described encoder, in which a distance between the scale and the first lens array, a distance between the first and second lens arrays, a distance between the second and third lens arrays, and a distance between the third lens array and the light-receiving surface of the light-receiving unit are preferably each equal to twice a focal length of the lenses included in the first to third lens arrays.

In this way, an encoder including a 1-power erect-image optical system formed by three lens arrays and capable of reducing the effect of the aberration can be implemented in a concrete manner.

A fifth exemplary aspect of the present invention is the above-described encoder, in which the optical system is preferably a reducing erect-image optical system.

In this way, an encoder including a reducing erect-image optical system capable of reducing the effect of the aberration can be implemented in a concrete manner.

A sixth exemplary aspect of the present invention is the above-described encoder, in which
the optical system preferably includes:
a first lens array disposed adjacent to the scale in an irradiation direction of the light source;
a second lens array disposed on a side of the first lens array on which the light-receiving unit is disposed; and
a third lens array disposed on a side of the second lens array on which the light-receiving unit is disposed,
a first pitch between the lenses included in the first array in the measurement direction is preferably longer than a second pitch between the lenses included in the second lens array in the measurement direction, and
the second pitch is preferably longer than a third pitch between the lenses included in the third lens array in the measurement direction.

In this way, an encoder including a reducing erect-image optical system formed by three lens arrays and capable of reducing the effect of the aberration can be implemented in a concrete manner.

A seventh exemplary aspect of the present invention is the above-described encoder, in which the optical system is preferably a ½-power erect-image optical system, and
a below-shown expression is preferably satisfied:

[Expression 1]

$$D1 = \frac{1+\sqrt{2}}{\sqrt{2}} f$$

$$D2 = (1+\sqrt{2})f$$

where: D1 is a first distance between the scale and the first lens array and between the second and third lens arrays; D2 is a second distance between the first and second lens arrays and between the third lens array and the light-receiving surface of the light-receiving unit; and f is a focal length of the lenses included in the first to third lens arrays.

In this way, an encoder including a ½-power erect-image optical system formed by three lens arrays and capable of reducing the effect of the aberration can be implemented in a concrete manner.

An eighth exemplary aspect of the present invention is the above-described encoder, in which the lenses included in the first to third lens arrays are preferably cylindrical lenses whose longitudinal direction is perpendicular to an irradiation direction of the light source and the measurement direction.

In this way, an encoder including an erect-image optical system formed by three lens arrays and capable of reducing the effect of the aberration can be implemented in a concrete manner.

A ninth exemplary aspect of the present invention is the above-described encoder, in which
the optical system preferably includes:
a fourth lens array disposed adjacent to the scale in an irradiation direction of the light source;
a fifth lens array disposed on a side of the fourth lens array on which the light-receiving unit is disposed, the fifth lens array being configured to form an both-side telecentric optical system with the fourth lens array;
a sixth lens array disposed on a side of the fifth lens array on which the light-receiving unit is disposed; and
a seventh lens array disposed on a side of the sixth lens array on which the light-receiving unit is disposed, the seventh lens array being configured to form a both-side telecentric optical system with the sixth lens array, and
pitches between lenses included in the fourth to seventh lens arrays in the measurement direction are preferably equal to each other.

In this way, an encoder including a 1-power erect-image optical system formed by four lens arrays and capable of reducing the effect of the aberration can be implemented in a concrete manner. Further, the above-described configuration can reduce the fluctuation in the peak position of the interference fringes even when one or both of the distance between the scale and the fourth lens array and the distance between the seventh lens array and the light-receiving surface of the light-receiving unit fluctuates.

A tenth exemplary aspect of the present invention is the above-described encoder, in which
a distance between the scale and the fourth lens array and a distance between the seventh lens array and the light-receiving surface of the light-receiving unit are preferably each equal to a focal length of the lenses included in the fourth to seventh lens arrays, and a distance between the fourth and fifth lens arrays, a distance between the fifth and sixth lens arrays, and a distance between the sixth and seventh lens arrays are preferably each equal to twice a focal length of the lenses included in the fourth to seventh lens arrays.

In this way, an encoder including a 1-power erect-image optical system formed by four lens arrays and capable of reducing the effect of the aberration can be implemented in a concrete manner. Further, the above-described configuration can reduce the fluctuation in the peak position of the interference fringes even when one or both of the distance between the scale and the fourth lens array and the distance between the seventh lens array and the light-receiving surface of the light-receiving unit fluctuates.

An eleventh exemplary aspect of the present invention is the above-described encoder, in which the lenses included in the fourth to seventh lens arrays are preferably cylindrical lenses whose longitudinal direction is perpendicular to an irradiation direction of the light source and the measurement direction.

In this way, an encoder including a 1-power erect-image optical system formed by four lens arrays and capable of reducing the effect of the aberration can be implemented in a concrete manner.

A twelfth exemplary aspect of the present invention is the above-described encoder, preferably further including an aperture with an opening formed therein, the opening being located at a place through which an optical axis of the lenses included in the fourth to seventh lens arrays pass through, in which the aperture is preferably interposed between the fourth and fifth lens arrays and between the sixth and seventh lens arrays or between both of them.

In this way, it is possible to reduce the fluctuation in the peak strength of the interference fringes even when one or both of the distance between the scale and the fourth lens array and the distance between the seventh lens array and the light-receiving surface of the light-receiving unit fluctuates.

A thirteenth exemplary aspect of the present invention is the above-described encoder, in which when the optical system is an N-power (N is a positive real number) erect-image optical system, preferably, four light-receiving elements consecutively arranged in a row form one area and the area is repeatedly arranged in the measurement direction in the light-receiving element array, an arrangement pitch of light-receiving elements of the light-receiving element array is preferably ¼N of an arrangement pitch of the pattern, and the four light-receiving elements of the area preferably output an A phase signal, a B phase signal, an A- phase signal, and a B- phase signal, respectively.

In this way, it is possible to provide an encoder configured to perform position detection by using four-phase signals.

According to the present invention, it is possible to prevent or reduce the effect of the lens aberration in an encoder using an optical system formed by using a lens array.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings. The same symbols are assigned to the same components throughout the drawings, and their duplicated explanation is omitted as appropriate. Encoders according to the below-described exemplary embodiments are formed as optical encoders that detect light coming from a grating pattern and thereby calculate a position.

First Exemplary Embodiment

Figure 1:
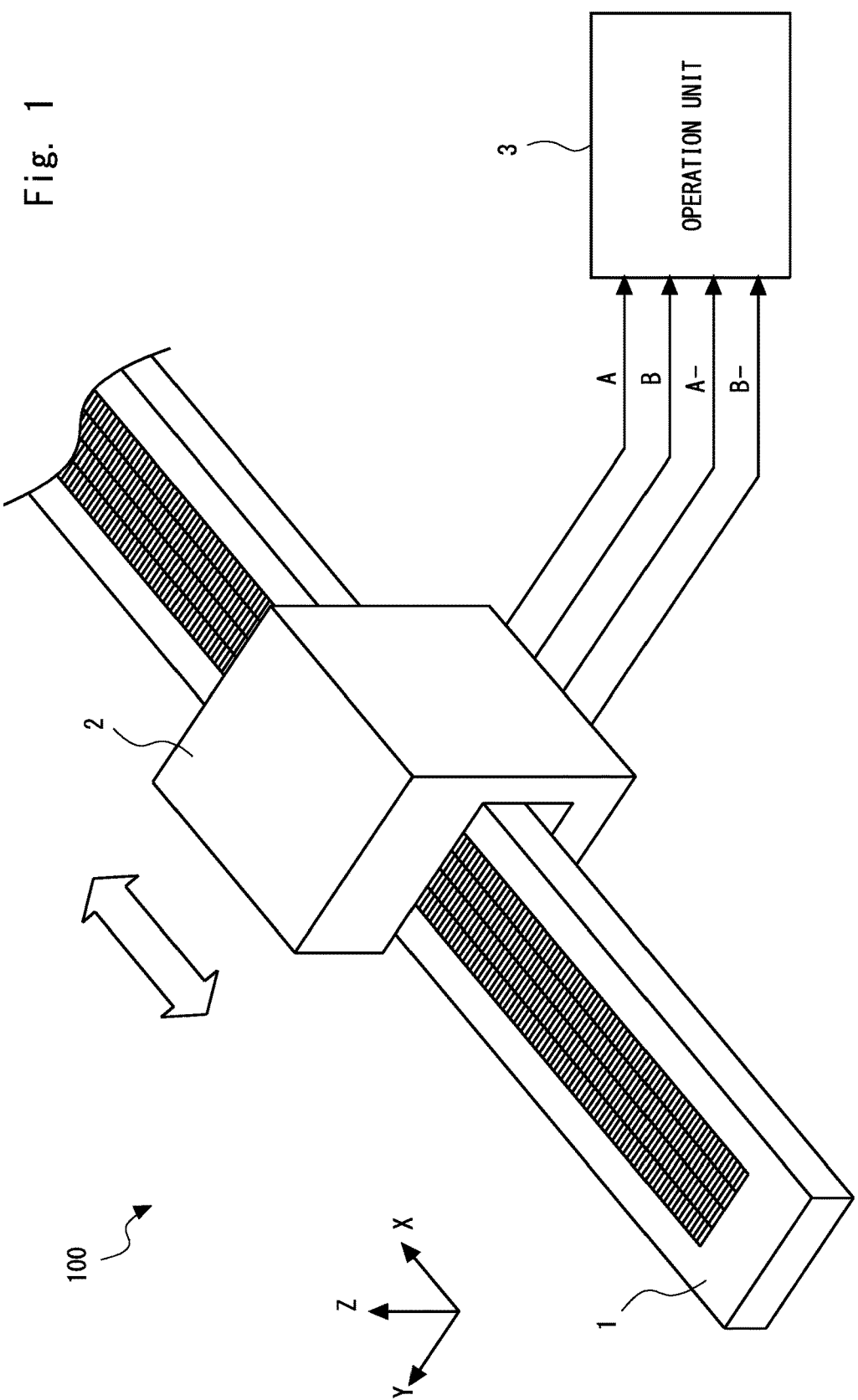
FIG. 1 is a perspective view showing an external appearance of an encoder according to a first exemplary embodiment.

An encoder according to a first exemplary embodiment of the present invention is explained hereinafter. FIG. 1 is a perspective view showing an external appearance of an encoder 100 according to the first exemplary embodiment. As shown in FIG. 1, the encoder 100 includes a scale 1, a detection head 2, and an operation unit 3.

Figure 2:
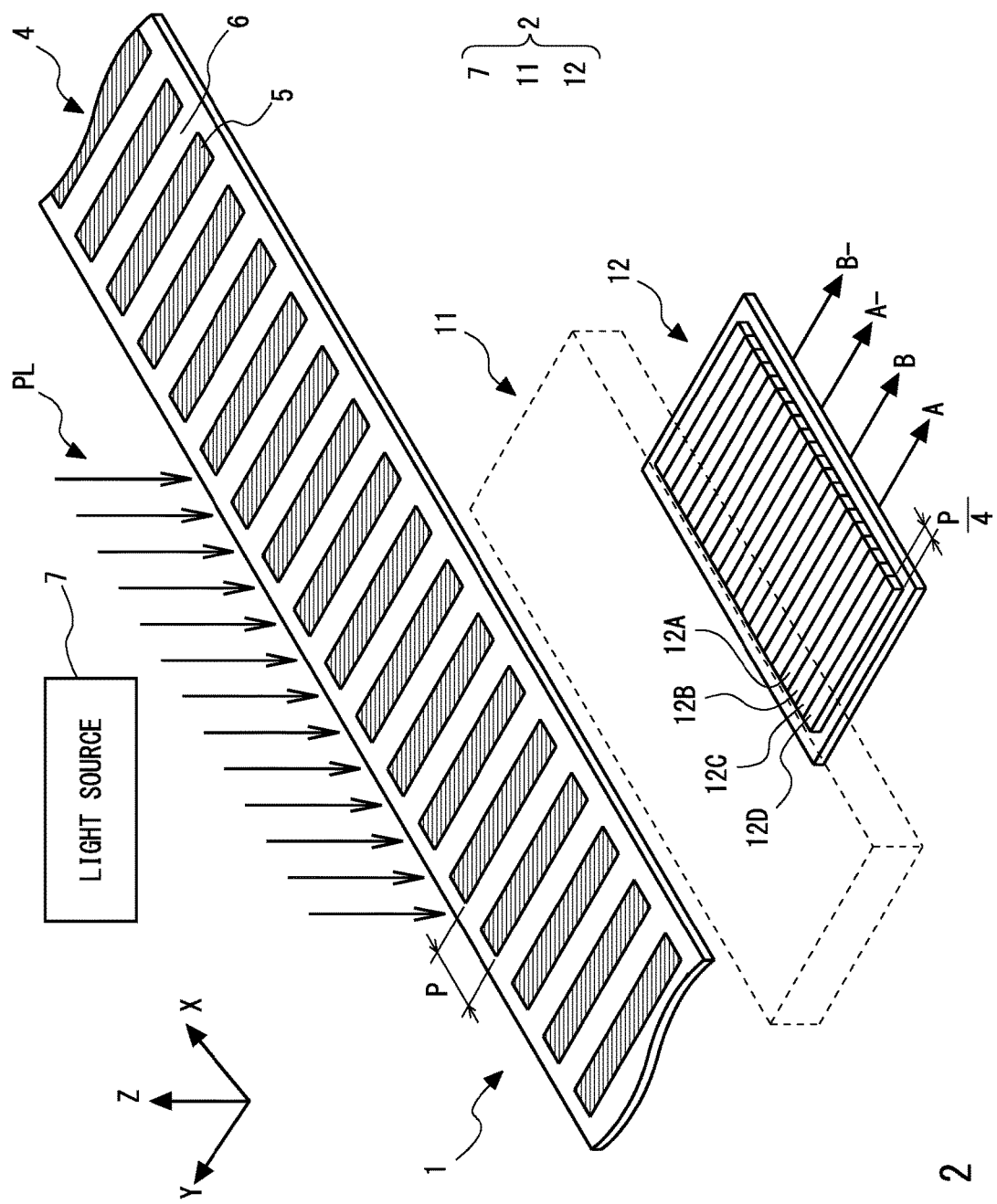
FIG. 2 shows details of the inside of a detection head and a scale according to the first exemplary embodiment.

The scale 1 is explained hereinafter. FIG. 2 shows details of the inside of the detection head 2 of the encoder 100 and the scale 1 according to the first exemplary embodiment. As shown in FIG. 2, the scale 1 is formed as a plate member whose longitudinal direction is in parallel with an X-direction which is the measurement direction of the encoder 100. The scale 1 includes a grating pattern 4 which is an incremental pattern. The grating pattern 4 is a pattern whose longitudinal direction (i.e., the longitudinal direction of each rectangular part of the grating pattern 4) is in parallel with a Y-direction. Note that the Y-direction is a direction perpendicular to (or intersecting) the X-direction (i.e., the measurement direction) on a plane where the pattern of the scale 1 is disposed.

The grating pattern 4 is a pattern for generating an incremental signal. In the grating pattern 4, light-transmitting parts 5 and non-transmitting parts 6, whose longitudinal directions are in parallel with the Y-direction, are alternately arranged in the measurement direction (X-direction) with the same pitch P. The pitch P of the grating pattern 4 in the measurement direction (X-direction) is, for example, 50 μm.

In this case, for example, the light-transmitting parts 5 whose respective widths in the measurement direction (X-direction) are each 25 μm and non-transmitting parts 6 whose respective widths in the measurement direction (X-direction) are each 25 μm are alternately arranged.

The detection head 2 is explained hereinafter. As shown in FIG. 1, the detection head 2 is configured so that the detection head 2 can be moved relative to the scale 1 in the measurement direction (X-direction) and outputs an electric signal indicating a result of detection of the grating pattern 4. As shown in FIG. 2, the detection head 2 includes a light source 7, an optical system 11, and a light-receiving unit 12.

As shown in FIG. 2, the light source 7 irradiates the scale 1 with light PL. The light source 7 consists of, for example, a light source and a collimate lens. In this case, examples of the light source include an LED (Light Emitting Diode), a semiconductor laser, an SLED (Self-Scanning Light Emitting Device), and an OLED (Organic light-emitting diode).

The optical system 11 forms the light that has been diffracted in the scale 1 into an image on the light-receiving surface of the light-receiving unit 12. In this way, interference fringes are formed on the light-receiving surface of the light-receiving unit 12.

The light-receiving unit 12 is formed as a light-receiving element array. The light-receiving unit 12 receives the light that has passed through the grating pattern 4 and converts it into an electric signal. The light-receiving unit 12 includes a plurality of light-receiving elements 12A, a plurality of light-receiving elements 12B, a plurality of light-receiving elements 12C, and a plurality of light-receiving elements 12D. For example, photodiodes can be used as the light-receiving elements 12A to 12D. The light-receiving elements 12A to 12D are arranged in the measurement direction (X-direction) and four of them (i.e., four light-receiving elements consisting of the light-receiving elements 12A to 12D, respectively) form one set of light-receiving elements. The set formed by the light-receiving elements 12A to 12D (that is, formed by four light-receiving elements) is repeatedly arranged in the measurement direction (X-direction).

The light-receiving elements 12A to 12D are configured so that the width of each of them in the measurement direction (X-direction) is equal to a quarter of the pitch P of the grating pattern 4 (i.e., equal to P/4). From the above explanation, it can be understood that the light-receiving unit 12 is configured to output four-phase signals. For example, the light-receiving elements 12A, 12B, 12C and 12D output A phase signal, B phase signal, A-phase signal, and B-phase signal, respectively.

Referring to FIG. 1 again, the rest of the configuration of the encoder 100 is explained hereinafter. The operation unit 3 processes the four-phase signals output from the light-receiving unit 12 and calculates a relative displacement between the scale 1 and the detection head 2 in the measurement direction (X-direction). In the encoder 100, the operation unit 3 can be implemented by using, for example, a calculator including a CPU (Central Processing Unit) such as a personal computer.

Figure 3:
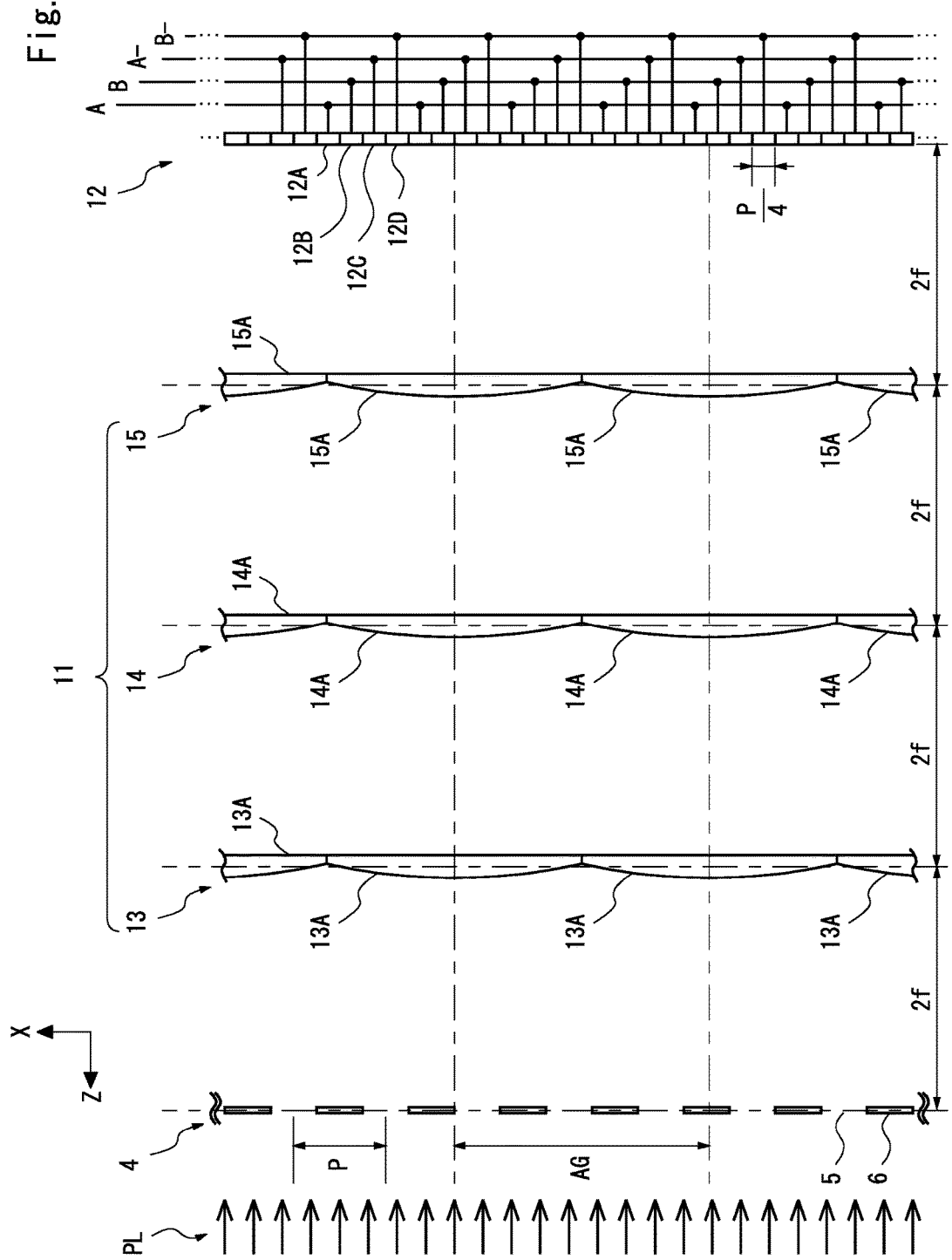
FIG. 3 shows a configuration of an optical system according to the first exemplary embodiment.

Next, the optical system 11 according to this exemplary embodiment is explained hereinafter. FIG. 3 shows a configuration of the optical system 11 according to the first exemplary embodiment. The optical system 11 is configured as a 1-power erect-image optical system including three lens arrays 13 to 15 (also referred to as first to third lens arrays, respectively) arranged in a row (i.e., arranged in a tandem manner) in a light irradiation direction (i.e., Z-direction perpendicular to X- and Y-directions). The lens arrays 13 to 15 are arranged in the order of the lens arrays 13, 14 and 15 as viewed from the scale 1.

In the lens array 13, lenses 13A are arranged in a row (i.e., arranged side by side) in the measurement direction (X-direction). Each of the lenses 13A is formed as a cylindrical lens having a focal length f, in which the lens has a shape of a plano-convex lens, i.e., has a convex shape on the scale 1 side on the X-Z plane cross section and has a rectangular shape on the Y-Z plane cross section (not shown). In the lens array 14, lenses 14A are arranged in a row in the X-direction. In the lens array 15, lenses 15A are arranged in a row in the X-direction. Each of the lenses 14A and 15A is formed as a cylindrical lens having the same shape and the same size as those of the lens 13A and having the focal length f.

In this exemplary embodiment, the lens array pitch of the lens arrays 13 to 15 (the distance between the optical axes of neighboring lenses in the lens array) is represented by "AG". It should be noted that the lenses 13A, 14A and 15A are configured so that the lens array pitch AG is not equal to an integral multiple of the pitch P of the grating pattern 4 (AG≠kP (k is an integer)). Needless to say, the width of each of the lenses 13A, 14A and 15A in the X-direction is equal to the lens array pitch AG.

Further, in this exemplary embodiment, the optical system 11 is configured so that the distance between the grating pattern 4 and the lens array 13, the distance between the lens arrays 13 and 14, the distance between the lens arrays 14 and 15, and the distance between the lens array 15 and the light-receiving surface of the light-receiving unit 12 are each equal to twice the focal length f of the lenses 13A, 14A and 15A.

Figure 4:
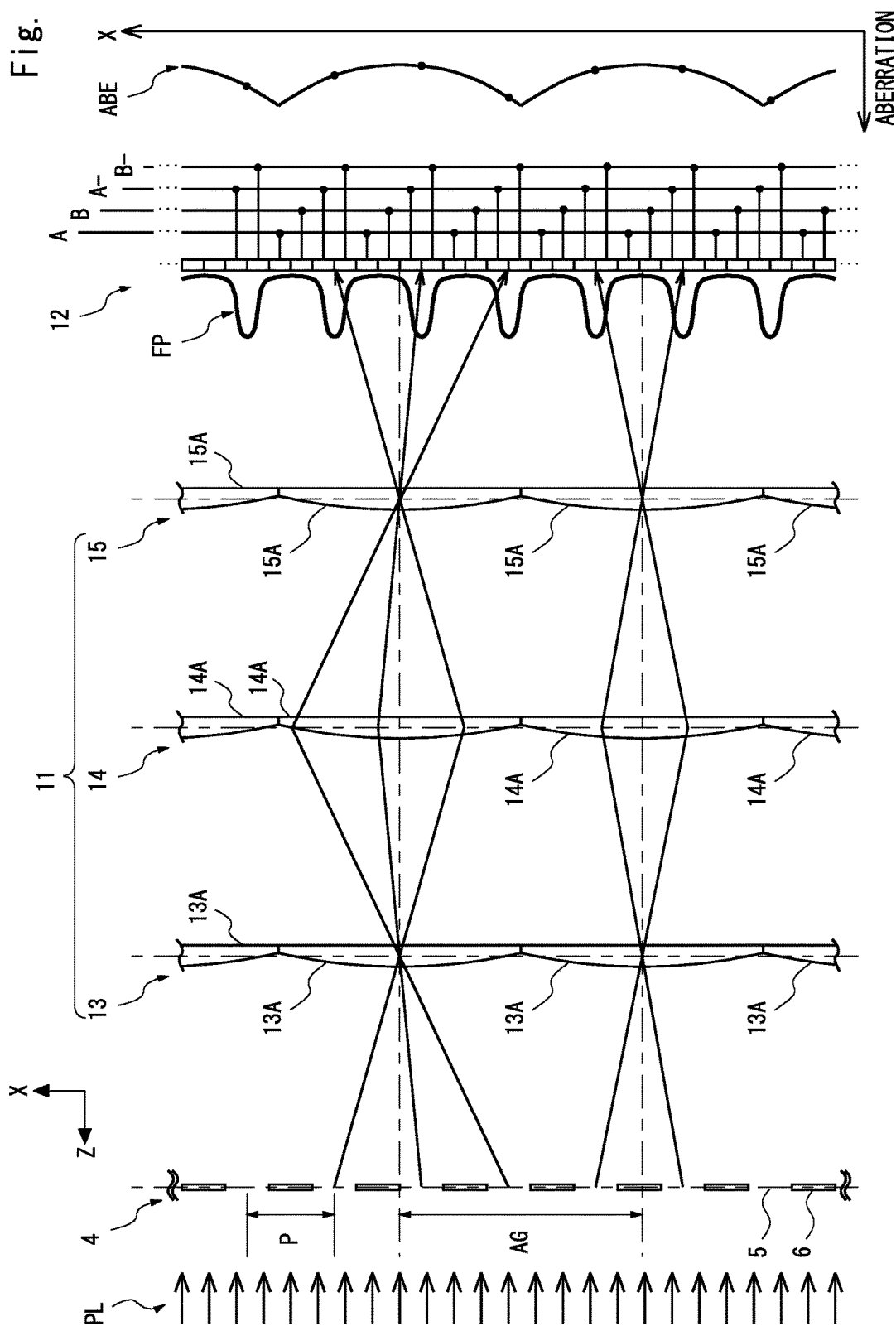
FIG. 4 shows a relation between interference fringes formed in a light-receiving unit and aberrations due to an optical system according to the first exemplary embodiment.

As a result, the optical system 11 is configured as a 1-power erect-image optical system in which "−1"-power inverted optical systems are arranged in series. FIG. 4 shows a relation between interference fringes FP formed in the light-receiving unit 12 and aberrations due to the optical system 11 according to the first exemplary embodiment. Although the lens array pitch AG is not equal to an integral multiple of the pitch P (AG≠kP), there is no phase difference in the image of the grating pattern 4 (i.e., the interference fringes) on the light-receiving surface of the light-receiving unit 12, as shown in FIG. 4. As a result, the interference fringes FP, which reflect the light/dark of the grating pattern 4, are formed on the light-receiving surface of the light-receiving unit 12.

On the other hand, since the lens array pitch AG is not equal to an integral multiple of the pitch P (AG≠kP), the repetition period of the aberration ABE due to the lens array (i.e., the lens array pitch AG) is not equal to an integral multiple of the pitch P of the grating pattern 4. Therefore, as shown in FIG. 4, the magnitude of the aberration that affects the light parts of the interference fringes FP is not uniform. As a result, it can be understood that the effect of the aberration is averaged as observed over the whole interference fringes.

Further, in this exemplary embodiment, since the lens array pitch AG, in particular, can be set to a value that is not equal to an integral multiple of the pitch P of the grating pattern 4 (AG≠kP), the lens array pitch AG can be set to substantially any arbitrary value. Therefore, since the manufacturing tolerance for the lens array can be increased, it is possible to improve the yields and reduce the manufacturing cost. Further, according to the present invention, the pitch of the lens array is not limited to any particular value. Therefore, even when the pitch of the lens array fluctuates due to a change in the use environment, the interference fringes can still be detected.

As described above, the lens array pitch AG can be set to a value that is not equal to an integral multiple of the pitch P of the grating pattern 4. This feature can be realized because the optical system 11 is configured as an erect-image optical system. The principle (i.e., reason) for this is explained hereinafter.

If the optical system 11 is configured as an inverted optical system, the image of the diffraction grating on the light-receiving surface becomes discontinuous on the boundary of the lenses constituting the lens array. Therefore, in this case, it is necessary to set the width of each of the lenses of the lens array (the arrangement pitch) in the measurement direction to a specific value, i.e., a value equal to an integral multiple of the diffraction grating as described in Patent literature 1 and 2. When the width of each of the lenses of the lens array (the arrangement pitch) in the measurement direction is not equal to an integral multiple of the diffraction grating, an image in a halfway place in the measurement direction of the light-transmitting parts (the refection parts) or the non-transmitting parts (the non-reflection parts) of the diffraction grating is formed as an image on the lens boundary. That is, since the phase of the image on the lens boundary becomes discontinuous, the accuracy of the position detection by the encoder deteriorates.

In contrast to this, since the optical system 11 according to this exemplary embodiment is an erect-image optical system, the image of the diffraction grating on the light-receiving surface on the boundary of the lenses constituting the lens array is continuous as a matter of course. Therefore, even when the width of each of the lenses of the lens array (the arrangement pitch) in the measurement direction is not equal to an integral multiple of the diffraction grating and an image in a halfway place in the measurement direction of the light-transmitting parts (the refection parts) or the non-transmitting parts (the non-reflection parts) of the diffraction grating is formed as an image on the lens boundary, the image of the diffraction grating becomes continuous. Consequently, an image that accurately reflects the diffraction grating is formed on the light-receiving surface. From the above explanation, it can be understood that, by configuring the optical system 11 as an erect-image optical system, the lens array pitch AG can be set to a value that is not equal to an integral multiple of the pitch P of the grating pattern 4.

Second Exemplary Embodiment

An encoder according to a second exemplary embodiment of the present invention is explained hereinafter. The configuration of an encoder 200 according to the second exemplary embodiment is obtained by replacing the optical system 11 and the light-receiving unit 12 of the encoder 100 according to the first exemplary embodiment with an optical system 21 and a light-receiving unit 22, respectively.

Figure 5:
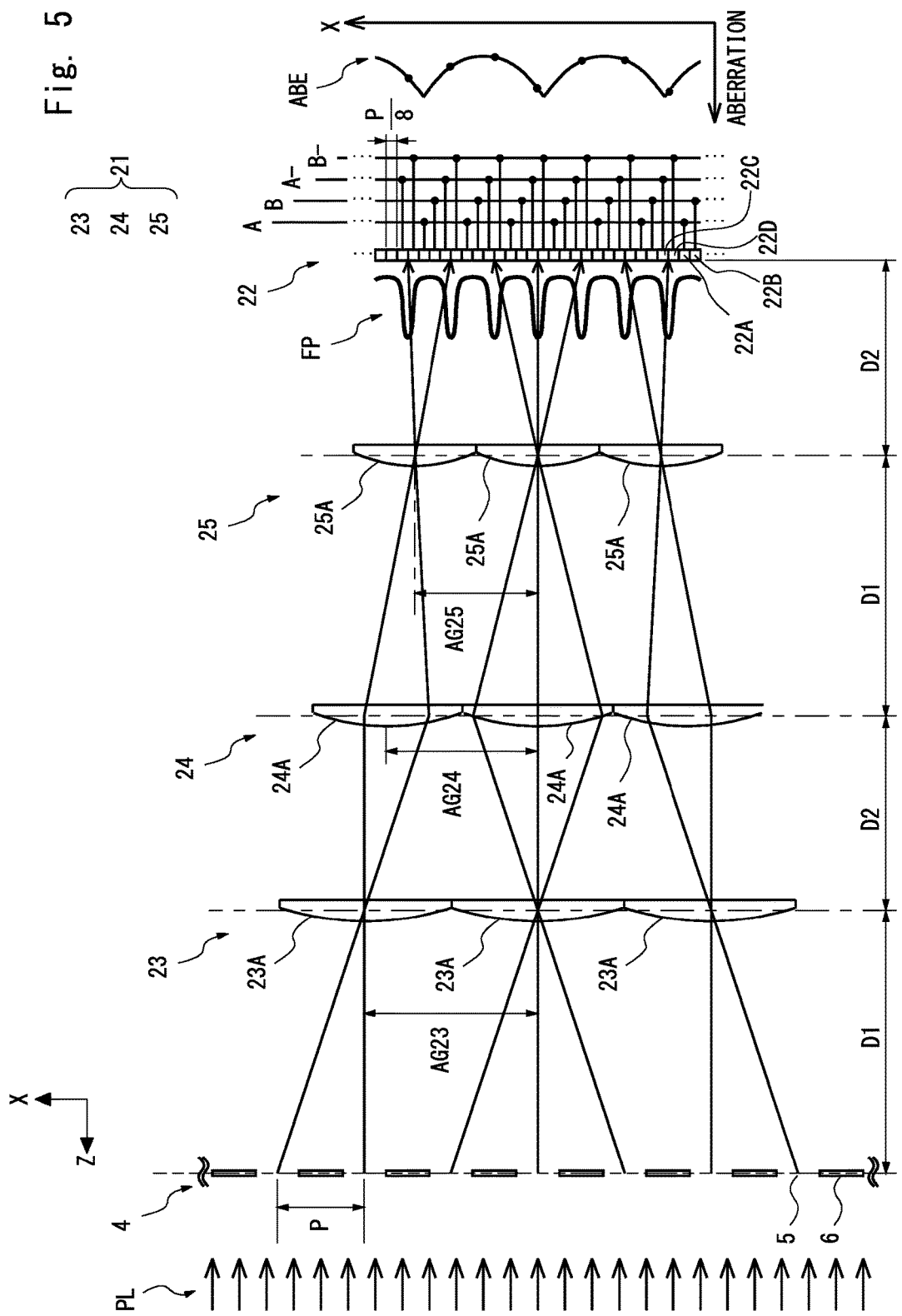
FIG. 5 shows a configuration of an optical system and a light-receiving unit according to a second exemplary embodiment.

FIG. 5 shows a configuration of the optical system 21 and the light-receiving unit 22 according to the second exemplary embodiment. Firstly, the optical system 21 is explained hereinafter. The optical system 21 is configured as a reducing erect-image optical system including three lens arrays 23 to 25 (also referred to as first to third lens arrays, respectively) arranged in a row (i.e., arranged in a tandem manner) in a light irradiation direction (i.e., Z-direction). The lens arrays 23 to 25 are arranged in the order of the lens arrays 23, 24 and 25 as viewed from the scale 1.

In the lens array 23, lenses 23A are arranged in a row (i.e., arranged side by side) in the X-direction. Each of the lenses 23A is formed as a cylindrical lens, in which the lens has a shape of a plano-convex lens, i.e., has a convex shape on the scale 1 side on the X-Z plane cross section and has a rectangular shape on the Y-Z plane cross section (not shown). In the lens array 24, lenses 24A are arranged in a row in the X-direction. In the lens array 25, lenses 25A are arranged in a row in the X-direction. Similarly to the lens 23A, each of the lenses 24A and 25A is formed as a cylindrical lens, in which the lens has a shape of a plano-convex lens, i.e., has a convex shape on the scale 1 side on the X-Z plane cross section and has a rectangular shape on the Y-Z plane cross section (not shown).

In this exemplary embodiment, the focal length of each of the lenses 23A, 24A and 25A is f. Further, the size of the lens 24A in the X-direction is smaller than that of the lens 23A and the size of the lens 25A in the X-direction is smaller than that of the lens 24A. That is, the lens arrays 23 to 25 are configured so that none of the lens array pitches AG23 to AG25 of the lens arrays 23 to 25 (also referred to as first to third lens pitches, respectively) are equal to an integral multiple of the pitch P of the scale 1 and a relation "AG23>AG24>AG25" holds. In this exemplary embodiment, letting D1 represent the distance between the grating pattern 4 and the lens array 23 and the distance between the lens arrays 24 and 25 and D2 represent the distance between the lens arrays 23 and 24 and the distance between the lens array 25 and the light-receiving surface of the light-receiving unit 22, the distances D1 and D2 are set as shown in the below-shown Expressions (1) and (2), respectively.

[Expression 2]

$$D1 = \frac{1+\sqrt{2}}{\sqrt{2}} f \qquad (1)$$

[Expression 3]

$$D2 = (1+\sqrt{2})f \qquad (2)$$

As a result, the optical system 21 is configured as a ½-power erect-image optical system. Even in this case, although the lens array pitches AG23 to AG25 are not equal to an integral multiple of the pitch P (AG23≠kP, AG24≠kP, AG25≠kP), there is no phase difference in the interference fringes FP, i.e., the image of the grating pattern 4 on the light-receiving surface of the light-receiving unit 22 as shown in FIG. 5. As a result, the interference fringes FP, which reflect the light/dark of the grating pattern 4, are formed on the light-receiving surface of the light-receiving unit 22.

On the other hand, since the lens array pitches AG23 to AG25 are not equal to an integral multiple of the pitch P (AG23≠kP, AG24≠kP, AG25≠kP), the repetition period of the aberration due to the lens array is not equal to an integral multiple of the pitch P of the grating pattern 4. Therefore, similarly to the first exemplary embodiment, the magnitude of the aberration that affects the light parts of the interference fringes FP is not uniform. As a result, even when the reducing erect-image optical system is used, the effect of the aberration can be averaged as observed over the whole interference fringes.

Further, based on the examination of both the first and second exemplary embodiments, it can be understood that when the optical system is an N-power (N is a positive real number) erect-image optical system, the arrangement pitch of the light-receiving elements of the light-receiving element array may be (or should be) set to ¼N of the arrangement pitch P of the grating pattern.

Third Exemplary Embodiment

An encoder according to a third exemplary embodiment of the present invention is explained hereinafter. The configuration of an encoder 300 according to the third exemplary embodiment is obtained by replacing the optical system 11 of the encoder 100 according to the first exemplary embodiment with an optical system 31.

Figure 6:
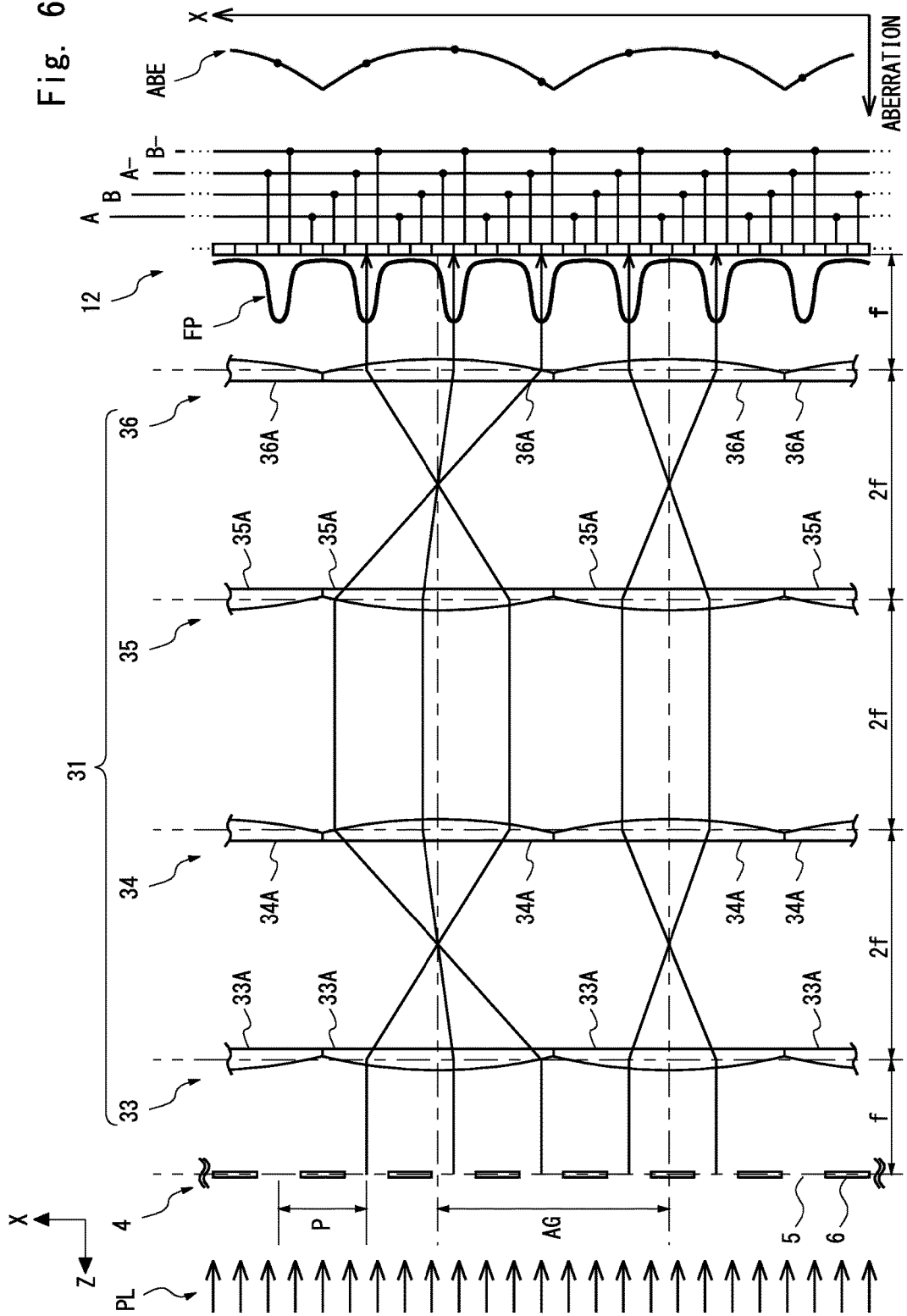
FIG. 6 shows a configuration of an optical system according to a third exemplary embodiment.

FIG. 6 shows a configuration of the optical system 31 according to the third exemplary embodiment. The optical system 31 is configured as a both-side telecentric 1-power erect-image optical system. The optical system 31 includes four lens arrays 33 to 36 (also referred to as fourth to seventh lens arrays, respectively) arranged in a row (i.e., arranged in a tandem manner) in a light irradiation direction (i.e., Z-direction).

In the lens array 33, lenses 33A are arranged in a row (i.e., arranged side by side) in the X-direction. Each of the lenses 33A is formed as a cylindrical lens having a focal length f, in which the lens has a shape of a plano-convex lens, i.e., has a convex shape on the scale 1 side on the X-Z plane cross section and has a rectangular shape on the Y-Z plane cross section (not shown). The lens array 33 is disposed in a place that is the focal length f away from the scale 1 on the light-receiving unit 12 side.

In the lens array 34, lenses 34A are arranged in a row in the X-direction. Each of the lenses 34A is formed as a cylindrical lens having a focal length f, in which the lens has a shape of a plano-convex lens, i.e., has a convex shape on the light-receiving unit 12 side on the X-Z plane cross section and has a rectangular shape on the Y-Z plane cross section (not shown). The lens array 34 is disposed in a place that is away from the lens array 33 by a distance equivalent to twice the focal length f (i.e., 2f) on the light-receiving unit 12 side.

As shown in FIG. 6, a group of lenses consisting of the lens arrays 33 and 34 (front-side lens group) forms a both-side telecentric optical system, which is a "−1"-power inverted optical system.

In the lens array 35, lenses 35A are arranged in a row in the X-direction. Similarly to the lenses 33A, each of the lenses 35A is formed as a cylindrical lens having a focal length f, in which the lens has a shape of a plano-convex lens, i.e., has a convex shape on the scale 1 side on the X-Z plane cross section and has a rectangular shape on the Y-Z plane cross section (not shown). The lens array 35 is disposed in a place that is away from the lens array 34 by a distance equivalent to twice the focal length f (i.e., 2f) on the light-receiving unit 12 side.

In the lens array 36, lenses 36A are arranged in a row in the X-direction. Each of the lenses 36A is formed as a cylindrical lens having a focal length f, in which the lens has a shape of a plano-convex lens, i.e., has a convex shape on the light-receiving unit 12 side on the X-Z plane cross section and has a rectangular shape on the Y-Z plane cross section (not shown). The lens array 36 is disposed in a place that is away from the lens array 35 by a distance equivalent to twice the focal length f (i.e., 2f) on the light-receiving unit 12 side. Note that the distance between the lens array 36 and the light-receiving surface of the light-receiving unit 12 is equal to the focal length f.

As shown in FIG. 6, a group of lenses consisting of the lens arrays 35 and 36 (rear-side lens group) forms a both-side telecentric optical system, which is a "−1"-power erect-image inverted optical system.

As described above, by arranging two "−1"-power inverted optical systems, i.e., the front-side lens group (the lens arrays 33 and 34) and the rear-side lens group (the lens arrays 35 and 36) in series, the optical system 31 is configured as a 1-power erect-image optical system. Therefore, similarly to the first exemplary embodiment, although the lens array pitch AG is not equal to an integral multiple of the pitch P (AG≠kP), there is no phase difference in the image of the grating pattern 4 (i.e., the interference fringes) on the light-receiving surface of the light-receiving unit 12. As a result, the interference fringes FP, which reflect the light/dark of the grating pattern 4, are formed on the light-receiving surface of the light-receiving unit 12.

On the other hand, since the lens array pitch AG is not equal to an integral multiple of the pitch P (AG≠kP), the repetition period of the aberration due to the lens array (i.e., the lens array pitch AG) is not equal to an integral multiple of the pitch P of the grating pattern 4. Therefore, similarly to the first exemplary embodiment, the magnitude of the aberration that affects the light parts of the interference fringes FP is not uniform. As a result, the effect of the aberration is averaged as observed over the whole interference fringes.

Fourth Exemplary Embodiment

Figure 7:
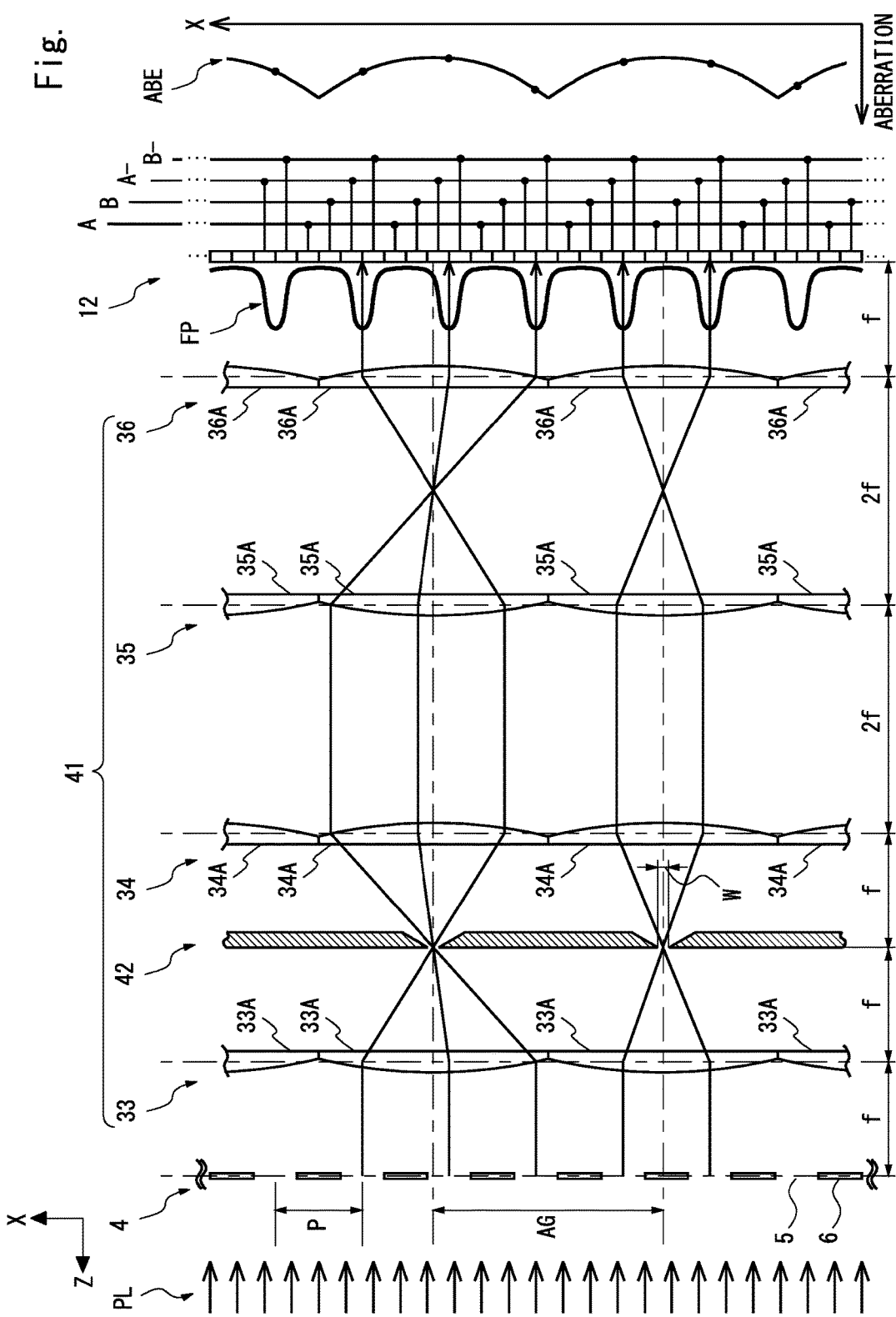
FIG. 7 shows a configuration of an optical system of an encoder according to a fourth exemplary embodiment.

An encoder according to a fourth exemplary embodiment of the present invention is explained hereinafter. An encoder 400 according to the fourth exemplary embodiment is a modified example of the encoder 300 according to the third exemplary embodiment. FIG. 7 shows a configuration of an optical system 41 of the encoder 400 according to the fourth exemplary embodiment. The optical system 41 is configured as a both-side telecentric 1-power erect-image optical system that is obtained by adding an aperture (i.e., a component with apertures formed therein, hereinafter simply called an "aperture") 42 in the optical system 31 according to the third exemplary embodiment.

The aperture 42 is disposed at the middle between the lens arrays 33 and 34 (i.e., between the lens arrays 33 and 34 at a place equidistant from both arrays) and configured so that the aperture 42 has openings at places corresponding to the optical axes of the lenses 33A and 34A. Here, the width of the opening of the aperture 42 is represented by W. Then, the numerical aperture NA on the object side and the image-formation side is expressed by the below-shown Expression (3).

[Expression 4]

$$NA = \frac{W}{2f} \quad (3)$$

Further, letting λ, represent the wavelength of light PL, the depth of focus DOF of the encoder 400 is expressed by the below-shown Expression (4).

[Expression 5]

$$DOF = \frac{\lambda}{NA} = \frac{4f^2\lambda}{W^2} \quad (4)$$

According to this configuration, it is possible to prevent or reduce the fluctuation in the peak strength of the interference fringes detected by the light-receiving unit 12 even when the distance between the scale 1 and the optical system 41 fluctuates and the distance between the optical system 41 and the light-receiving unit 12 fluctuates.

In this exemplary embodiment, the place where the aperture is inserted can be changed. A modified example of the encoder 400 is explained hereinafter. An encoder 401, which is a modified example of the encoder 400, has a configuration that is obtained by replacing the optical system 41 of the encoder 400 with an optical system 51.

Figure 8:
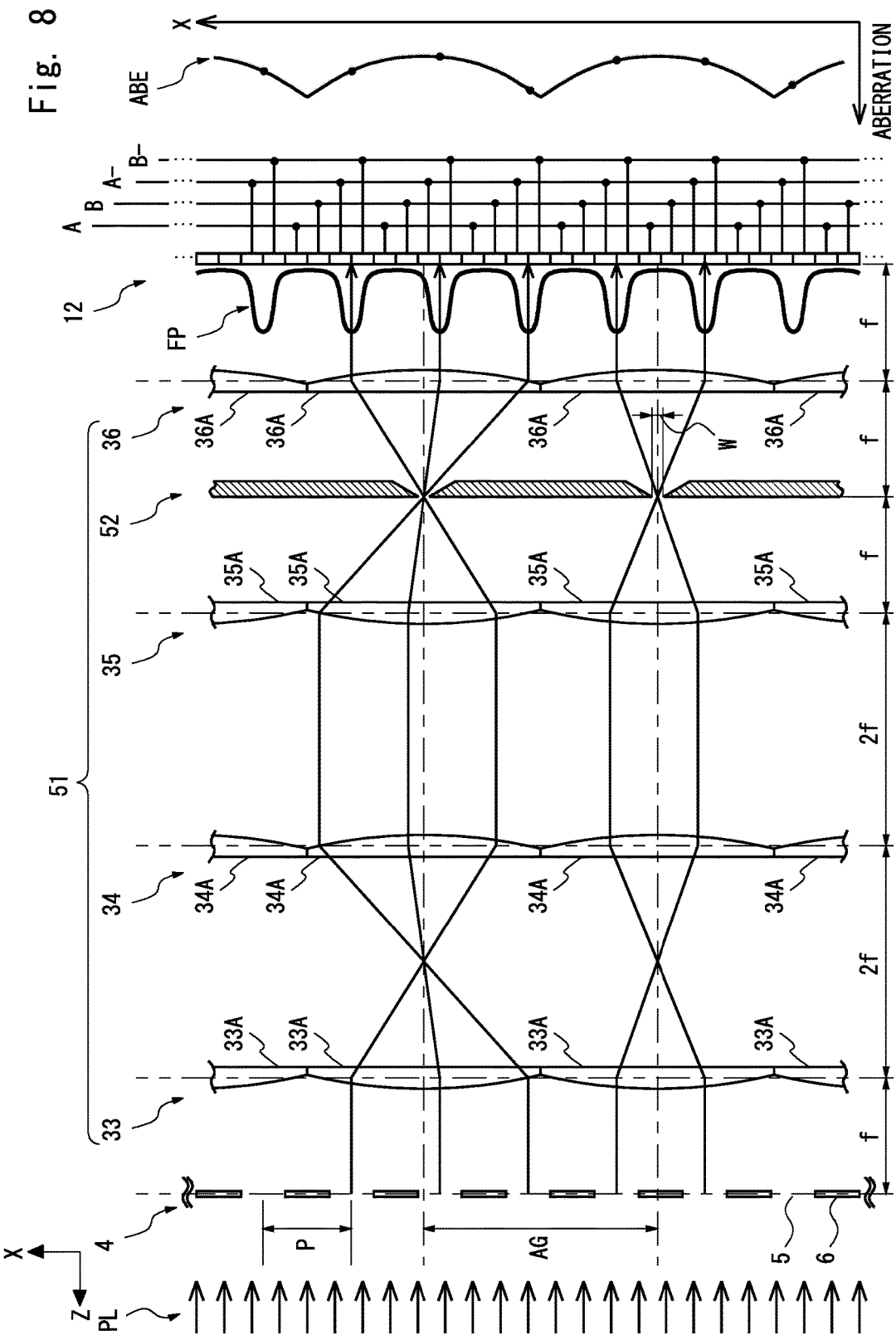
FIG. 8 shows a configuration of an optical system of a modified example of the encoder according to the fourth exemplary embodiment.

FIG. 8 shows a configuration of the optical system 51 of the encoder 401, which is a modified example of the encoder 400 according to the fourth exemplary embodiment. The optical system 51 has a configuration that is obtained by removing the aperture 42 of the optical system 41 and adding an aperture 52. The aperture 52 is disposed at the middle between the lens arrays 35 and 36 (i.e., between the lens arrays 35 and 36 at a place equidistant from both arrays) and configured so that the aperture 52 has openings at places corresponding to the optical axes of the lenses 35A and 36A. Here, the width of the opening of the aperture 52 is represented by W. The numerical aperture NA and the depth of focus DOF on the object side and the image-formation side in the encoder 401 are similar to those of the encoder 400, and therefore their explanations are omitted.

According to this configuration, similarly to the encoder 400, it is possible to prevent or reduce the fluctuation in the peak strength of the interference fringes detected by the light-receiving unit 12 even when the distance between the scale 1 and the optical system 51 fluctuates and the distance between the optical system 51 and the light-receiving unit 12 fluctuates.

Further, another modified example of the encoder 400 is explained. An encoder 402, which is another modified example of the encoder 400, has a configuration that is obtained by replacing the optical system 41 of the encoder 400 with an optical system 61.

Figure 9:
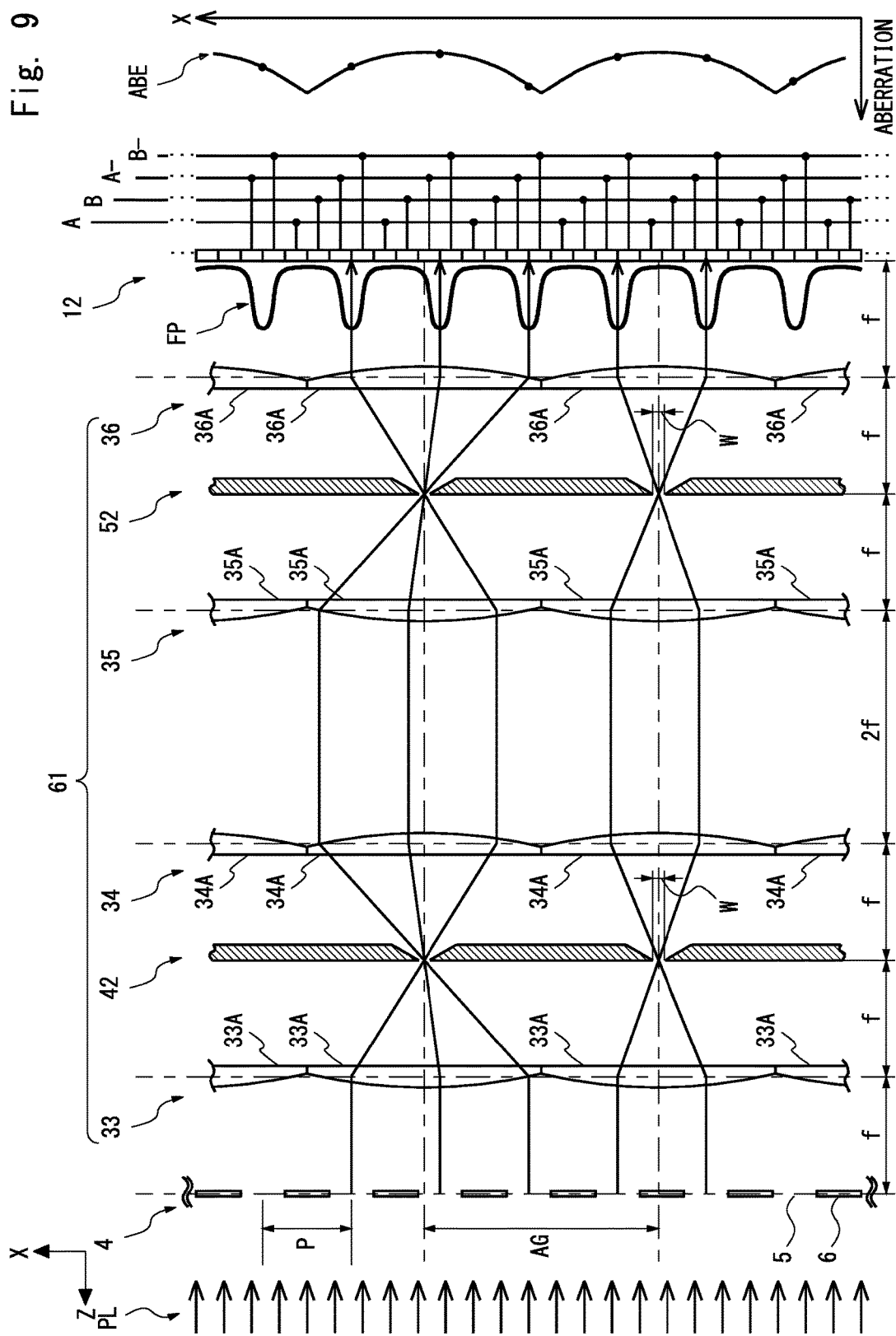
FIG. 9 shows a configuration of an optical system of a modified example of the encoder according to the fourth exemplary embodiment.
Figure 10:
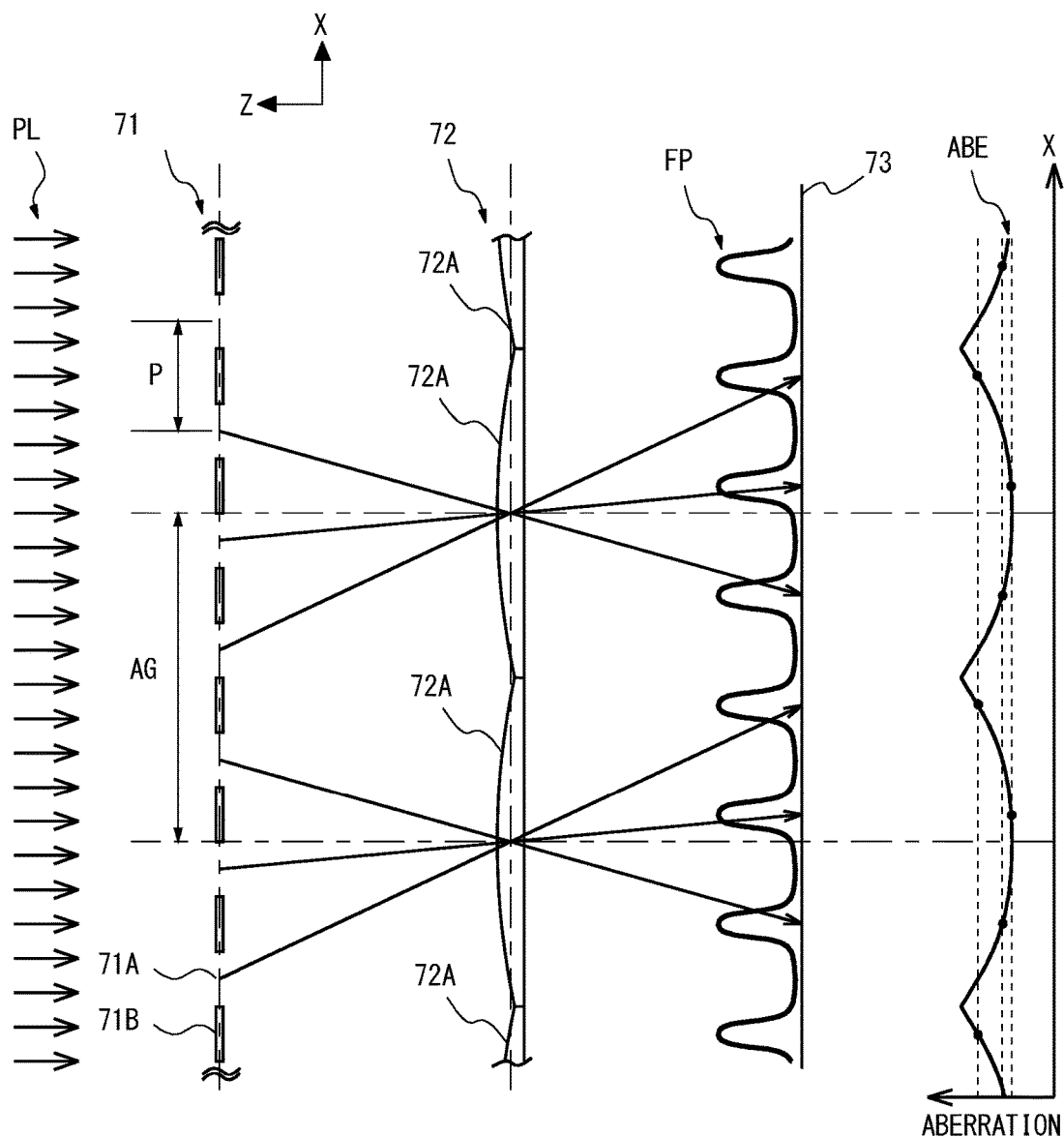
FIG. 10 schematically shows the effect of aberrations in an ordinary encoder.

FIG. 9 shows a configuration of the optical system 61 of the encoder 402, which is a modified example of the encoder 400 according to the fourth exemplary embodiment. The optical system 61 includes the aperture 42 of the optical system 41 and the aperture 52 of the optical system 51. The aperture 42 is similar to that of the encoder 400 and the aperture 52 is similar to that of the encoder 401, and therefore their explanations are omitted.

According to this configuration, similarly to the encoders 400 and 401, it is possible to prevent or reduce the fluctuation in the peak strength of the interference fringes detected by the light-receiving unit 12 even when the distance between the scale 1 and the optical system 61 fluctuates and the distance between the optical system 61 and the light-receiving unit 12 fluctuates.

Other Exemplary Embodiments

Note that the present invention is not limited to the aforementioned exemplary embodiments and may be changed as appropriate without departing from the spirit of the present invention. For example, although the above-described encoders are explained as transmission-type optical encoders, the present invention can also be applied to reflection-type optical encoders. In such cases, the light-transmitting parts and the non-transmitting parts of the grating pattern of the scale may be replaced by reflection parts and non-reflection parts, respectively. Further, the light-receiving unit may be disposed on a side of the scale 1 on which the light source 7 is disposed.

The above-described exemplary embodiments are explained on the assumption that the light-receiving unit outputs four-phase signals. However, the light-receiving unit may be configured to output signals having an arbitrary number of phase signals, instead of outputting the four-phase signals.

In the above-described exemplary embodiments, examples of an incremental pattern consisting of a grating pattern provided in a scale are explained. However, they are merely examples. For example, needless to say, the present invention can be similarly applied to patterns other than the grating pattern provided in a scale (e.g., an absolute pattern in which light-transmitting parts and non-transmitting parts are randomly arranged).

Further, needless to say, the encoder according to the present invention is not limited to linear encoders and the present invention can be applied to rotary encoders.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An encoder comprising:
   a scale with a pattern formed thereon, the pattern being arranged in a measurement direction;
   a detection head configured to be moved relative to the scale in the measurement direction and output an electric signal indicating a result of detection of the pattern; and
   an operation unit configured to calculate a relative displacement of the detection head relative to the scale from the electric signal, wherein
   the detection head comprises:
      a light source configured to irradiate the scale with light;
      a light-receiving unit including a light-receiving element array arranged in the measurement direction and configured to output a result of detection of the irradiation light applied to the light-receiving element array as the electric signal; and
      an optical system configured as an erect-image optical system, the erect-image optical system being configured to form light from the scale into interference fringes on a light-receiving surface of the light-receiving unit by using a lens array arranged in the measurement direction, wherein
   a pitch between neighboring lenses of the lens array is not equal to an integral multiple of a pitch of the pattern,
   the optical system is a 1-power erect-image optical system,
   the optical system comprises:
      a first lens array disposed adjacent to the scale in an irradiation direction of the light;
      a second lens array disposed on a side of the first lens array on which the light-receiving unit is disposed; and
      a third lens array disposed on a side of the second lens array on which the light-receiving unit is disposed, and
   pitches between lenses included in the first to third lens arrays in the measurement direction are equal to each other.

2. The encoder according to claim 1, wherein a distance between the scale and the first lens array, a distance between the first and second lens arrays, a distance between the second and third lens arrays, and a distance between the third lens array and the light-receiving surface of the light-receiving unit are each equal to twice a focal length of the lenses included in the first to third lens arrays.

3. The encoder according to claim 1, wherein the lenses included in the first to third lens arrays are cylindrical lenses whose longitudinal direction is perpendicular to an irradiation direction of the light source and the measurement direction.

4. An encoder comprising:
a scale with a pattern formed thereon, the pattern being arranged in a measurement direction;
a detection head configured to be moved relative to the scale in the measurement direction and output an electric signal indicating a result of detection of the pattern; and
an operation unit configured to calculate a relative displacement of the detection head relative to the scale from the electric signal, wherein
the detection head comprises:
a light source configured to irradiate the scale with light;
a light-receiving unit including a light-receiving element array arranged in the measurement direction and configured to output a result of detection of the irradiation light applied to the light-receiving element array as the electric signal; and
an optical system configured as an erect-image optical system, the erect-image optical system being configured to form light from the scale into interference fringes on a light-receiving surface of the light-receiving unit by using a lens array arranged in the measurement direction, wherein
a pitch between neighboring lenses of the lens array is not equal to an integral multiple of a pitch of the pattern,
the optical system is a reducing erect-image optical system, and
the optical system comprises:
a first lens array disposed adjacent to the scale in an irradiation direction of the light;
a second lens array disposed on a side of the first lens array on which the light-receiving unit is disposed; and
a third lens array disposed on a side of the second lens array on which the light-receiving unit is disposed,
a first pitch between the lenses included in the first array in the measurement direction is longer than a second pitch between the lenses included in the second lens array in the measurement direction, and
the second pitch is longer than a third pitch between the lenses included in the third lens array in the measurement direction.

5. The encoder according to claim 4, wherein
the optical system is a ½-power erect-image optical system, and
a below-shown expression is satisfied:

[Expression 1]

$$D1 = \frac{1+\sqrt{2}}{\sqrt{2}}f$$

$$D2 = (1+\sqrt{2})f$$

where: D1 is a first distance between the scale and the first lens array and between the second and third lens arrays; D2 is a second distance between the first and second lens arrays and between the third lens array and the light-receiving surface of the light-receiving unit; and f is a focal length of the lenses included in the first to third lens arrays.

6. An encoder comprising:
a scale with a pattern formed thereon, the pattern being arranged in a measurement direction;
a detection head configured to be moved relative to the scale in the measurement direction and output an electric signal indicating a result of detection of the pattern; and
an operation unit configured to calculate a relative displacement of the detection head relative to the scale from the electric signal, wherein
the detection head comprises:
a light source configured to irradiate the scale with light;
a light-receiving unit including a light-receiving element array arranged in the measurement direction and configured to output a result of detection of the irradiation light applied to the light-receiving element array as the electric signal; and
an optical system configured as an erect-image optical system, the erect-image optical system being configured to form light from the scale into interference fringes on a light-receiving surface of the light-receiving unit by using a lens array arranged in the measurement direction, wherein
a pitch between neighboring lenses of the lens array is not equal to an integral multiple of a pitch of the pattern,
the optical system is a 1-power erect-image optical system,
the optical system comprises:
a fourth lens array disposed adjacent to the scale in an irradiation direction of the light source;
a fifth lens array disposed on a side of the fourth lens array on which the light-receiving unit is disposed, the fifth lens array being configured to form an both-side telecentric optical system with the fourth lens array;
a sixth lens array disposed on a side of the fifth lens array on which the light-receiving unit is disposed; and
a seventh lens array disposed on a side of the sixth lens array on which the light-receiving unit is disposed, the seventh lens array being configured to form a both-side telecentric optical system with the sixth lens array, and
pitches between lenses included in the fourth to seventh lens arrays in the measurement direction are equal to each other.

7. The encoder according to claim 6, wherein
a distance between the scale and the fourth lens array and a distance between the seventh lens array and the light-receiving surface of the light-receiving unit are each equal to a focal length of the lenses included in the fourth to seventh lens arrays, and
a distance between the fourth and fifth lens arrays, a distance between the fifth and sixth lens arrays, and a distance between the sixth and seventh lens arrays are each equal to twice a focal length of the lenses included in the fourth to seventh lens arrays.

8. The encoder according to claim 6, wherein the lenses included in the fourth to seventh lens arrays are cylindrical lenses whose longitudinal direction is perpendicular to an irradiation direction of the light source and the measurement direction.

9. The encoder according to claim 6, further comprising an aperture with an opening formed therein, the opening being located at a place through which an optical axis of the lenses included in the fourth to seventh lens arrays pass through, wherein
the aperture is interposed between the fourth and fifth lens arrays and between the sixth and seventh lens arrays or between both of them.

10. An encoder comprising:
a scale with a pattern formed thereon, the pattern being arranged in a measurement direction;
a detection head configured to be moved relative to the scale in the measurement direction and output an electric signal indicating a result of detection of the pattern; and
an operation unit configured to calculate a relative displacement of the detection head relative to the scale from the electric signal, wherein
the detection head comprises:
a light source configured to irradiate the scale with light;
a light-receiving unit including a light-receiving element array arranged in the measurement direction and configured to output a result of detection of the irradiation light applied to the light-receiving element array as the electric signal; and
an optical system configured as an erect-image optical system, the erect-image optical system being configured to form light from the scale into interference fringes on a light-receiving surface of the light-receiving unit by using a lens array arranged in the measurement direction, wherein
a pitch between neighboring lenses of the lens array is not equal to an integral multiple of a pitch of the pattern,
when the optical system is an N-power (N is a positive real number) erect-image optical system,
four light-receiving elements consecutively arranged in a row form one area and the area is repeatedly arranged in the measurement direction in the light-receiving element array,
an arrangement pitch of light-receiving elements of the light-receiving element array is $\frac{1}{4}$N of an arrangement pitch of the pattern, and
the four light-receiving elements of the area output an A phase signal, a B phase signal, an A- phase signal, and a B- phase signal, respectively.

\* \* \* \* \*